United States Patent [19]
Dittner et al.

[11] Patent Number: 4,543,505
[45] Date of Patent: Sep. 24, 1985

[54] ELECTRIC TORQUE CONVERTER

[75] Inventors: Adam Dittner, Höchstadt; Georg Hartmann, Paderborn-Dahl, both of Fed. Rep. of Germany

[73] Assignee: FAG Kugelfischer Georg Schafer Kommanditgesellschaft auf aktien, Fed. Rep. of Germany

[21] Appl. No.: 512,777

[22] Filed: Jul. 11, 1983

[30] Foreign Application Priority Data

Jul. 10, 1982 [DE] Fed. Rep. of Germany ....... 3225908

[51] Int. Cl.⁴ .............................................. H02K 49/00
[52] U.S. Cl. ................................... 310/102 R; 318/140
[58] Field of Search ................ 318/140, 141; 310/112, 310/113, 102, 126; 322/95, 96

[56] References Cited

U.S. PATENT DOCUMENTS

| | | | |
|---|---|---|---|
| 1,493,853 | 5/1929 | Fraser | 310/102 |
| 2,506,809 | 5/1950 | Nims | 310/102 |
| 3,239,701 | 3/1966 | Campbell | 310/113 X |
| 3,340,448 | 9/1967 | Thiessen | 318/140 |
| 3,416,016 | 12/1968 | Murakami | 310/102 |
| 4,303,870 | 12/1981 | Nakamura et al. | 310/12 X |
| 4,341,989 | 7/1982 | Sandberg et al. | 322/95 |

FOREIGN PATENT DOCUMENTS

| | | |
|---|---|---|
| 939463 | 2/1956 | Fed. Rep. of Germany. |
| 1438811 | 2/1969 | Fed. Rep. of Germany. |
| 2101459 | 8/1972 | Fed. Rep. of Germany. |

Primary Examiner—Donovan F. Duggan
Attorney, Agent, or Firm—Ostrolenk, Faber, Gerb & Soffen

[57] ABSTRACT

An electric torque converter arranged between a driving and a driven system consists of an alternating current generator G which is connected to a dc motor M via a plurality of circuits C, D, Ko, which operate in parallel to each other.

9 Claims, 16 Drawing Figures

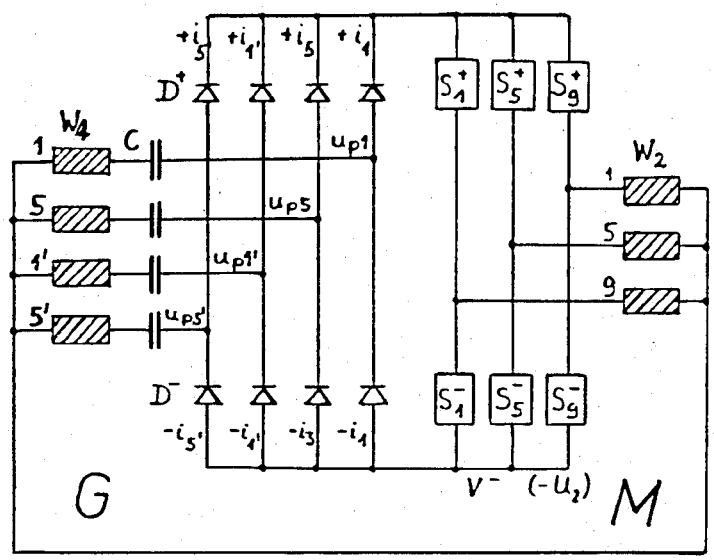
Fig.8a
| CURRENT | 0 - ΔT/4 | ΔT/4 - ΔT/2 | ΔT/2 - 3ΔT/4 | 3ΔT/4 - ΔT |
|---|---|---|---|---|
| $+i_1$ | | | | X |
| $+i_5$ | | | X | |
| $+i_{1'}$ | | X | | |
| $+i_{5'}$ | X | | | |
| $-i_1$ | | X | | |
| $-i_5$ | X | | | |
| $-i_{1'}$ | | | X | |
| $-i_{5'}$ | | | | X |
Fig.8b
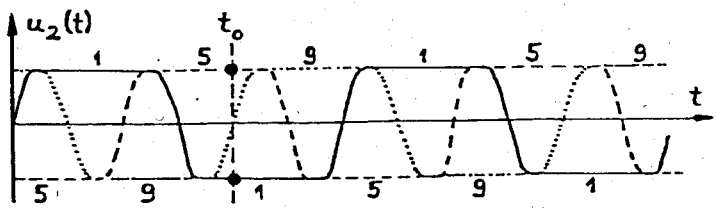
Fig.8c

ELECTRIC TORQUE CONVERTER

BACKGROUND AND BRIEF DESCRIPTION OF THE INVENTION

The present invention relates to an electric torque converter which is arranged between a driving and a driven system.

In many drive systems, particularly those having internal combustion engines, the drive source supplies high power with good efficiency only within a narrow range and generally at high speeds of rotation. On the other hand, the driven system may often require the application of high power at very different speeds of rotation depending on the operating conditions.

While mechanical gear shifts permit a step-wise conversion of the torque, the number of steps is limited by convenience in operation and the high expense inherent therein. Infinitely variable mechanical gear shifts are limited to relatively low transferrable powers.

Hydraulic torque converters operate with infinite variation and also make it possible to operate the drive source within the optimal range of speeds of rotation. However, their efficiency is satisfactory only within a rather narrow transmission range, so that they frequently must be combined with mechanical gear shifts.

There have also been attempts to use electrical machines for speedmatching and torque conversion. These systems can be classified in different groups.

The known systems utilize the fact that the speed and torque of an electrical machine can be regulated via the magnetic field applied to the machine. These systems include generator-motor combinations in which the field of one or both machines is so regulated via resistors, additional excitation machines or current regulators that the torque or the speed of rotation can be adapted to the operating condition of the driven system.

By the use of power electronics, torque regulation has been displaced by torque controls or speed controls. The known arrangements accordingly always contain electronic control circuits and/or microprocessors or process control computers. These known systems control either the field of the machines or the current, voltage or frequency of the electrical energy applied to the machine.

Perhaps the best systems are homopolar machines which usually provide good properties for torque conversion. However, these systems disadvantageously require very high currents which occur with low voltages and must be conducted over slip rings or the like. Additionally, they require control or regulation of the torque.

The object of the present invention is to provide an electric torque converter which, with high overall efficiency without the use of components which inherently produce a loss, has a linear speed/torque characteristic even at a motor speed of zero.

Using the solution of the present invention, a change in the driven speed at optimal drive speed is possible without employing a control device, the power which may be transmitted having a wide maximum and remaining practically constant.

West German Unexamined Application for Patent No. OS 14 38 811 discloses a circuit in which an asynchronous generator attached to a turbine is connected via capacitors and rectifiers and a starting resistor to propulsion motors (dc motors). But that case is concerned with a pure starting circuit for a turbine which operates at a constant speed of rotation. In that circuit, a starting resistor for the series motors cannot be dispensed with, while the capacitors serve exclusively to compensate for stray resistances.

On the other hand, the generator of the invention produces an approximately delta-shaped alternating voltage, the dc motor is externally excited or excited by permanent magnet, and the capacitors limit the current to a permissible value, even at a motor speed of zero. Furthermore, in the case of the present invention, an additional control of the "transmission ratio" can be provided but, contrary to known proposals, this is not for the purpose of adapting the driven rotational speed at each moment to be as constant as possible relative to the speed of rotation of the drive, but serves exclusively for the overall optimizing of the total power which can be transmitted.

The solution in accordance with the present invention, furthermore, has a low power loss which increases essentially with the power to be transmitted and decreases with an increase in the driven speed.

One advantageous embodiment of the subject matter of the invention resides in the fact that the conductors of the generator winding are arranged in triangular shape on the outer surface of a stationary cylinder which can dip into the air gap of a pole wheel which is provided with a permanent magnet.

For the adjustment of small machines, West German Pat. No. 939,463 discloses an arrangement wherein a rotor with a self-supporting winding in an air gap is located between a permanent-magnet core and a return ring which is fastened by screws.

West German Unexamined Application for Patent No. OS 21 01 459 also discloses a dc motor in which operation in different speed stages (change in transmission ratio) is possible by the connecting and disconnecting of parts of the armature winding.

The present invention can be used to particular advantage in automotive vehicles since the electrical converter can replace not only the change gearing but also the clutch means.

BRIEF DESCRIPTION OF THE DRAWINGS

For the purpose of illustrating the invention, there is shown in the drawings a form which is presently preferred, it being understood, however, that this invention is not limited to the precise arrangements and instrumentalities shown.

FIG. 8a illustrates the division of the windings into strand groups;

FIG. 8b is a table for the strand selection (current pulses are superimposed on each other to form a continuous direct current);

FIG. 8c shows the variations of the voltage of a motor strand group;

DETAILED DESCRIPTION OF THE PREFERRED EMBODIMENT

Figure 1A:
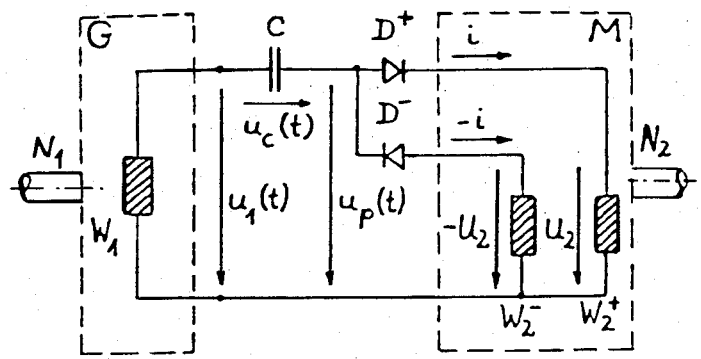
FIG. 1a is a wiring diagram of the electric torque converter.

The function of the electric torque converter is based on the combining, pursuant to the invention, of a generator G with a dc motor M, both of which will be described in detail below, via a circuit consisting of a capacitor C and two diodes $D^+$ and $D^-$ (FIG. 1a).

Figure 1B:
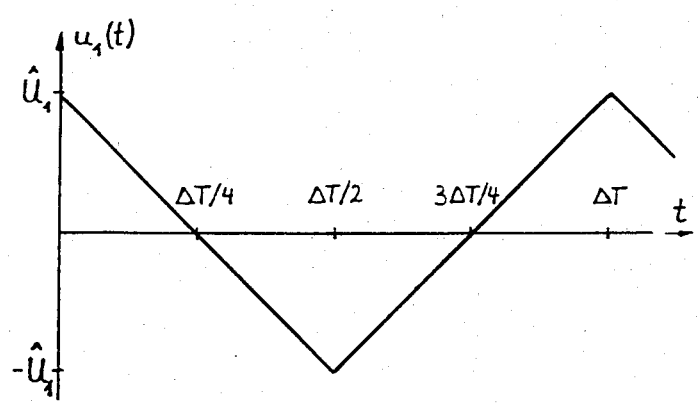
FIG. 1b shows the variation of the voltage of the generator G, in delta form.

The special generator G produces a triangle-shaped voltage (FIG. 1b), defined by the following equations:

$$u_1(t) = \hat{U}_1 \cdot (1 - 4t/\Delta T) \text{ for } 0 \leq t \leq \Delta T/2 \quad \text{(Eq. 1a)}$$

$$u_1(t) = -\hat{U}_1 \cdot (1 - 4t/\Delta T) \text{ for } \Delta T/2 \leq t \leq \Delta T \quad \text{(Eq. 1b)}$$

in which $T = 1/N_1$ is the time for one revolution at the speed of rotation $N_1$, while $\Delta T = T/n$ is the time within which the generator G having n pairs of poles turns past exactly one pair of poles. The peak voltage $\hat{U}_1 = k_1 N_1$ is to be proportional to the speed of rotation $N_1$ of the generator G, and the direct voltage $U_2 = k_2 N_2$ is to be proportional to the sped of rotation $N_2$ of the motor M. The special construction of the motor M resides in the fact that it is fed via two independent windings $W_2^+$ and $W_2^-$ on which the countervoltage $U_2$ of opposite polarity is present. For the sake of clarity of the drawing, commutating means of the dc motor M as well as means for producing the magnetic fields at G and M have not been shown in FIG. 1a.

Figure 2A:
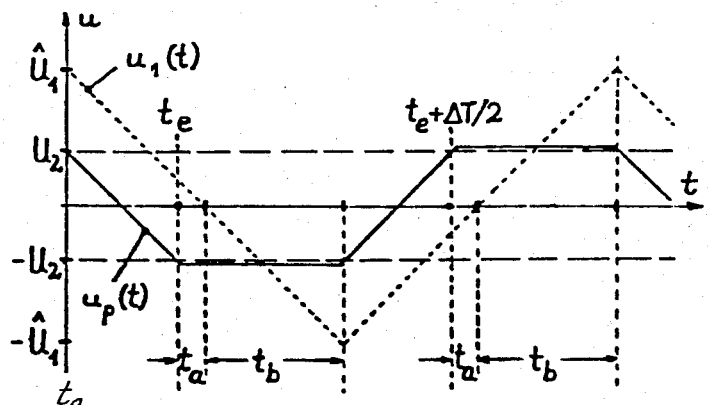
FIG. 2a shows the variation of the voltage at the capacitor C and the diodes D.

In FIG. 2a, at the time $t = 0$, $u_1(t) = \hat{U}_1$ is at the positive peak value and the capacitor C is charged via the diode $D^+$ to the voltage $u_c = \hat{U}_1 - U_2$. Upon a drop in voltage $u_1(t)$, there is also a drop in $u_p(t)$ (see FIG. 1a) and it becomes more negative than $+U_2$, but until the time $t_e$, it remains more positive than $-U_2$, i.e. both diodes $D^+$, $D^-$ are blocked. Only when the voltage $u_p$ tends to drop below $-U_2$ at $t > t_e$ will the diode $D^-$ become conductive and hold $u_p$ at $-U_2$. Since $u_1(t)$ continues to drop until $t = \Delta T/2$, the capacitor C will, from the time $t_e$ on, be charged via the diode $D^-$ to the opposite, equally large voltage $u_c = -\hat{U}_1 + U_2$. At $t = \Delta T/2$, this process is at an end and $u_1(t)$ begins to increase again. Thus, $u_p(t)$ also increases and becomes more positive than $-U_2$ but, until $t = \Delta T/2 + t_e$, more negative than $U_2$, i.e. both diodes $D^+$, $D^-$ are blocked. Only when $t_p$ becomes more positive than $U_2$ does $D^+$ conduct and charge C again to $u_c = \hat{U}_1 - U_2$.

This process now repeats itself periodically, the winding $W_2^+$ and $W_2^-$ of the dc motor M being traversed alternately by the charge-change current $i(t)$ of the capacitor C. This current has the value:

$$i(t) = C \cdot du_c(t)/dt = C \cdot (du_1(t)/dt - du_p(t)/dt) \quad \text{(Eq. 2)}$$

and can now be described section-wise for the above-mentioned time phases. If one considers $D^+$ and $D^-$ as ideal diodes with forward voltage $u_d = 0$ and the voltage of the generator G as ideal triangular voltage, then from Eqs. 1 and 2 one obtains:

for $0 \leq t \leq t_e$: $D^+$ and $D^-$ are blocked and $i(t) = 0$ (Eq. 3a)

for $t_e \leq t \leq \Delta T/2$: $u_c(t) = u_1(t) + U_2$ and
$i(t) = -4C \cdot \hat{U}_1/\Delta T$ (Eq. 3b)

$\Delta T/2 \leq t \leq t_e + \Delta T/2$: $D^+$ and $D^-$ are blocked and
$i(t) = 0$ (Eq. 3c)

for $t_e + \Delta T/2 \leq t \leq \Delta T$: $u_c(t) = u_1(t) - U_2$ and
$i(t) = 4C \cdot \hat{U}_1/\Delta T$ (Eq. 3d)

Figure 2B:
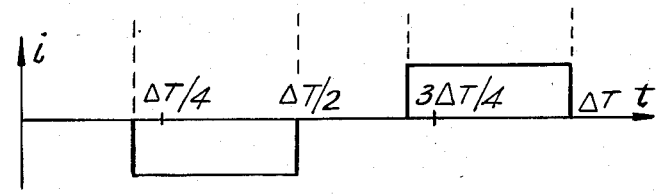
FIG. 2b shows the variation of the current in the windings of the motor M, in square form.

Thus, due to the triangular shape of $u_1(t)$, the current curve is an alternatively positive and negative square curve as shown in FIG. 2b. In this connection, the positive current flows through the winding $W_2^+$ and the negative current through the winding $W_2^-$ of the motor M so that the motor is driven in the same direction by both currents. Since during the blocking phases the voltage $u_p(t)$ changes with the same slope as $u_1(t)$, we also have, as shown in FIG. 2a:

$$t_e/2U_2 = \Delta T/4\hat{U}_1 \text{ or } t_e = (\Delta T/2) \cdot (U_2/\hat{U}_1) \quad \text{(Eq. 4)}$$

i.e. the current flow time $\Delta T/2 - (\Delta T/2) \cdot (U_2/\hat{U}_1)$ decreases with increasing voltage $U_2 = k_2 N_2$ and, therefore, with increasing driven speed $N_2$.

Now it can be shown how the torque-speed dependence of the combination in accordance with the invention comes about. For this purpose, first of all, the work $\Delta W_2$ absorbed by the motor M during a period $\Delta T$ of the delta voltage will be calculated. During the first half-period $0 \leq t \leq \Delta T/2$, a constant (see Eq. 3) current $i(t)$ with constant voltage $-U_2$ flows for the time $(\Delta T/2 - t_e)$ through winding $W_2^-$. During the second half-period $\Delta T/2 \leq t \leq \Delta T$, for the same time an opposite equally large current $i(t)$ flows with opposite equal voltage $+U_2$ so that the motor M takes up the same energy during both half-periods, i.e.

$$\begin{aligned} \Delta W_2 &= 2 \cdot U_2 \cdot i \cdot (\Delta T/2 - t_e) \\ &= 2 \cdot U_2 \cdot (4C \cdot \hat{U}_1/\Delta T) \cdot (\Delta T/2 - (\Delta T/2) \cdot (U_2/\hat{U}_1)) \\ &= 4C \cdot U_2 \cdot (\hat{U}_1 - U_2) \end{aligned} \quad \text{(Eq. 5)}$$

Since this energy is removed in each period $\Delta T$, one can determine therefrom the power $P_2 = \Delta W_2/\Delta T$ and thus also the torque $M_2 = P_2/(2\pi \cdot N_2)$ and one obtains, with $\hat{U}_1 k_1 N_1$, $U_2 = k_2 N_2$ and $\Delta T = 1/(N_1 n)$:

$$P_2 = (4C \cdot U_2 \cdot (\hat{U}_1 - U_2))/\Delta T \text{ or} \quad \text{(Eq. 6a)}$$

$$P_2 = (4k_2 \cdot n \cdot C) \cdot N_1 \cdot N_2 \cdot (k_1 N_1 - k_2 N_2) \quad \text{(Eq. 6b)}$$

$$M_2 = (2k_2 \cdot n \cdot C/\pi) \cdot N_1/(k_1 N_1 - k_2 N_2) \quad \text{(Eq. 7)}$$

Since these relationships have been calculated for a combination of ideal generator G with ideal motor M with the use of ideal diodes D and an ideal capacitor C, no ohmic resistances determine the function in this calculation. Accordingly, in the ideal case, no energy is lost and the power $P_1$ given off by the generator G must be equal to the power $P_2$ absorbed by the motor M (Eq. 6). Since the torque of the generator G is $M_1 = P_1/(2\pi \cdot N_1)$, therefore, one obtains:

$$P_1 = (4k_2 \cdot n \cdot C) \sim N_1 \cdot N_2 \cdot (k_1 N_1 - k_2 N_2) = P_2 = P \quad \text{(Eq. 8)}$$

$$M_1 = (2k_2 \cdot n \cdot C/\pi) \cdot N_2 \cdot (k_1 N_1 - k_2 N_2) \text{ and} \quad \text{(Eq. 9)}$$

$$M_2/M_1 = N_1/N_2 \quad \text{(Eq. 10)}$$

Figure 3:
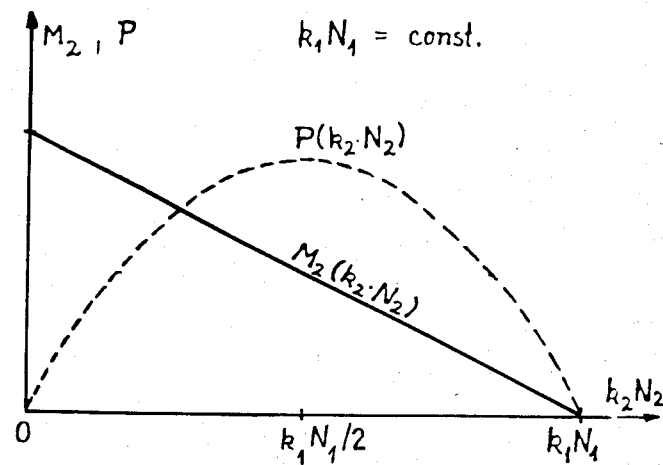
FIG. 3 is a diagram of the torque and power transmission from the drive to the driven side.

The relationship in Eq. 10 shows the torque converter behavior of the arrangement in accordance with the invention. The driven torque $M_2$ for a driven speed $N_2 = 0$ appears initially to become infinite. From Eq. 7 and FIG. 3, it is seen that $M_2(N_2)$ drops linearly, starting from a maximum value at $N_2 = 0$. This finite value of $M_2$, however, becomes understandable if one bears in mind that the torque $M_1$ at the generator G (Eq. 9) also becomes zero for $N_2 = 0$. Thus, a maximum torque $M_2$ can be maintained on the driven side with the speed of rotation $N_2 = 0$, in which connection we have $P_2 = P_1 = M_1 = 0$. The optimum power transfer between drive side and driven side takes place with a speed ratio with which the derivative $dP/dN_2$ equals 0 and, therefore, with $$dP/dN_2 = k_1 N_1 - 2k_2 N_2 = 0; \; N_2/N_1 = k_1/2k_2 \quad \text{(Eq. 11)}$$

or with the speed ratio at which $\hat{U}_1 = k_1 N_1$ is just twice as great at $U_2 = k_2 N_2$. The driven torque $M_2$ and the power P drop finally to zero when $N_2$ reaches the value where $N_2 k_2$ equals $N_1 k_1$, i.e. where $U_2$ becomes equal to $\hat{U}_1$ (FIG. 3).

Eqs. 6 to 11 completely describe the behavior of the electric torque converter. In the following, it will now only be explained why, with the driven speed $N_2 = 0$, a torque $M_2 = (2k_2 \cdot n \cdot C/\pi) \cdot N_1$ is maintained (Eq. 7) without require torque (Eq. 9) or power (Eq. 8) at the generator G.

With $N_2 = 0$, we have $U_2 = N_2 k_2 = 0$ and thus $t_e = (\Delta T/2) \cdot (U_2/\hat{U}_1) = 0$, i.e. the current pulses each reach a maximum width of $\Delta T/2$; $i(t)$ does not produce any power at the motor M with $U_2 = 0$ and hence $P_2 = 0$. However, the voltage $u_1(t)$ at the generator G lies at values between $-\hat{U}_1$ and $+\hat{U}_1$ so that the instantaneous power $P_1(t)$ is definitely not 0. The power given off vanishes over each half-period $\Delta T/2$ of the delta voltage $u_1(t)$ since, although during this time the current $i(t)$ is constant, the voltage $u_1(t)$, however, has equal positive and negative values. The current I, therefore, drives the generator G from $t = 0$ to $t = \Delta T/4$ and from $t = \Delta T/2$ to $t = 3\Delta T/4$, while it brakes it during the intermediate time phases.

This change remains in existence also upon an increase in speed of rotation $N_2$ with decreasing ratio $t_a/t_b$ between drive time and brake time (FIG. 2a) until $N_2$ has reached a value such that $N_2 \cdot k_2 = N_1 \cdot K_1/2$, i.e. until $U_2$ equals $\hat{U}_1/2$. Of course, the power in Eq. 8 can now also be calculated directly, and with Eq. 1 and Eq. 3 one obtains $$\Delta W_1 = \int_0^{\Delta T} u_1(t) \cdot i(t) dt = 2 \cdot \int_{t_e}^{\Delta T/2} U_1 \cdot (1 - 4t/\Delta T) \cdot \quad \text{(Eq. 12)}$$

$$(-4C \cdot \hat{U}_1/\Delta T) dt$$

$$= -(8C \cdot \hat{U}_1^2/T) \cdot (t - 2t^2/\Delta T)\Big|_{t_e}^{\Delta T/2} = 4C \cdot (\hat{U}_1 U_2 - U_2^2)$$

$$P_1 = \Delta W_1/\Delta T = 4C \cdot U_2 \cdot (\hat{U}_1 - U_2)/\Delta T \quad \text{(Eq. 13)}$$

i.e. the power $P_1$ produced by the generator G is equal to the power $P_1$ consumed in the motor M, as can be noted from a comparison of Eq. 13 with Eq. 6a.

FIG. 3 shows how, with constant drive speed $N_1$ and with fixed $k_2$, the speed $N_2$ can establish itself at the driven end depending on the torque requirement. Although the electric torque converter operates with good efficiency throughout the entire range, the maximum power is transmitted only in the vicinity of $K_2 N_2 = k_1 N_1/2$. By varying $k_2$ during the operation, the product $k_2 N_2$ can be kept at $k_1 N_1/2$ within a wide range of $N_2$ in case of large power requirement. Of course, an increase in the tranferrable power also brings about a further increase of the torque $M_2$ at low speeds.

In the simplest case, $k_2 = U_2/N_2$ can be changed by a gearing installed between motor and driven side. This combination is frequently found in hydrodynamic converter gear shifts. In addition to this, there are further very simple possibilities of changing $k_2$ in the case of the electrical converter. Since the countervoltage $U_2 = k_2 N_2$ of a dc motor is proportional to the speed $N_2$, the induction $B_2$ and the active conductor length, $k_2$ itself must be proportional to $B_2$ and to the active conductor length. The possibility is thus provided of so adjusting $k_2$, by changing the active conductor length in the motor or by changing the induction $B_2$, that the necessary power is always available.

Figure 4:
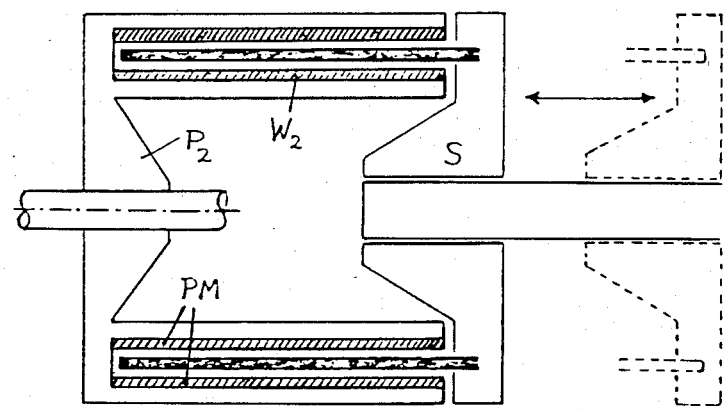
FIG. 4 is a diagrammatic view in longitudinal section of the motor M.

The change in the field will have little effect in practice since the field of the motor M of the invention is advantageously produced by permanent magnets. On the other hand, two simple possibilities, based on the type of construction, offer themselves for controlling $k_2$ via the change in the active conductor length. Since the dc motor M is preferably so constructed that a stationary winding $W_2$ lying on a cylinder wall dips into the air gap of a pole wheel $P_2$ (FIG. 4), the depth of immersion can be continuously varies by means of the carriage S. In this way, however, the active conductor length $l_2$ and $k_2$ are also changed, so that this arrangement has the function of an infinitely variable transmission.

Figure 5:
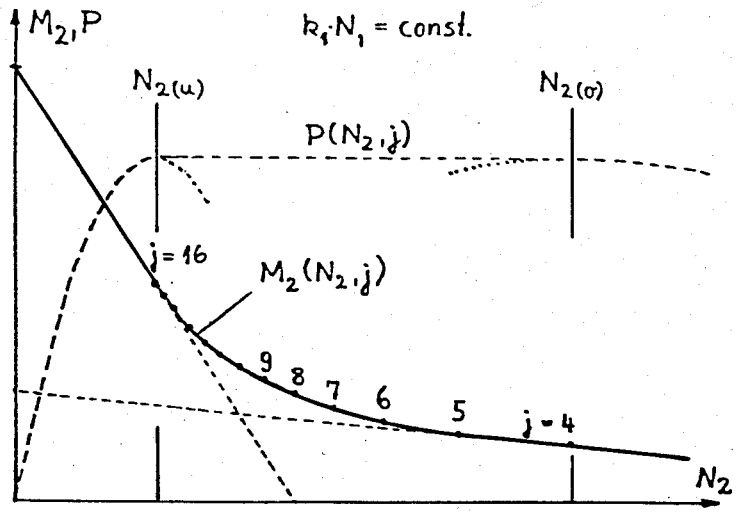
FIG. 5 is a diagram of the power matching between drive and driven side.

For practical use, however, even a step-wise change of $K_2$ is sufficient, which can be effected in simple fashion by section-wise connection or disconnection of conductor lengths $l_2$. Thus, for instance, the total conductor length $l_2$ can be divided into 16 pieces $\Delta l_2 = l_2/16$ and the motor M operated with an effective conductor length of $j \cdot \Delta l_2/16$. FIG. 5 shows that with large $k_2$ (i.e. $j = 16$) a very large torque is obtained with $N_2 = 0$ and that between a lower speed $N_{2(u)}$ and an upper speed $N_{2(o)}$ there is present a wide range of practically optimum power matching. The constant steps $\Delta l_2$ of the conductor length have the result that with low speeds with narrow power maximums, a narrow stepping takes place and at high speed with widened power maximums, the steps become more and more coarse so that the mismatch of the power remains limited to about 1% within a very wide range of speeds.

The matching of $K_2$ to the operating condition by the use of one of the above-indicated methods, therefore, results in a broadening, pursuant to the invention of the region of maximum power transmission.

For the function in accordance with the invention of the electric torque converter, it is immaterial how the generator G produces a triangular voltage characterized by Eq. 1. Nevertheless, one particularly simple construction of such a generator G will be proposed.

The pole wheel $P_1$ of the generator G (FIGS. 6 and 9) consists of an inner ring and an outer ring, each having 2n permanent magnets PM, the poles of which are opposite each other in such a manner as to alternately produce zones with a radially inward (x's in FIG. 6) and a radially outward (dots in FIG. 6) extending magnetic field. The magnetic field is closed by inner and outer magnetically conductive rings R. The cylindrically arranged winding $W_1$ dips into th air gap, and the components of the conductor lengths which extend parallel to the axis of rotation of the pole wheel $P_1$ are perpendicular to the relative speed $v$ and to the magnetic field.

Figure 7A:
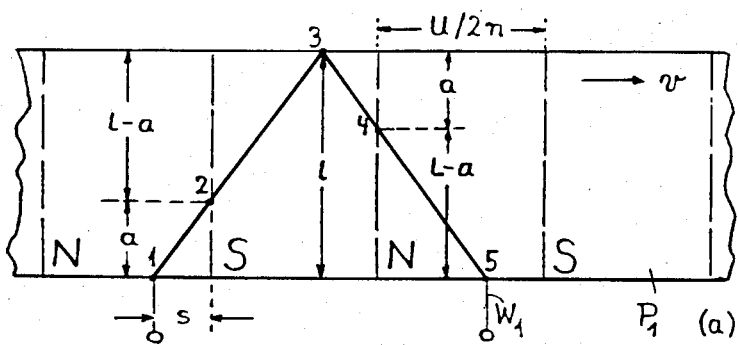
FIG. 7a is a partial view of the generator winding $W_1$.

In FIG. 7a, the winding $W_1$ is shown in such a manner that the plane of the air gap lies in the plane of the paper. The time t=0 is so selected that entrance 1, reversal point 3 and exit 5 of the V-shaped conductor loop $W_1$ coincide with the magnetization limits of the pole wheel. The path s is then also zero at t=0 and increases with s=v·t. The active conductor length which lies in the direction of the axis of rotation, i.e. the length lying in FIG. 7 in the direction of the magnetization limits, can now be easily indicated as a function of s. The contributions of the individual conductor lengths to the voltage $u_1$ are to be counted positively or negatively depending on the direction of travel of the conductor and the direction of the magnetic field, namely:

$$u_1 \sim (+l_{12}) \cdot (-B) + (+l_{23}) \cdot (+B) + (-l_{34}) \cdot (+B) + (-l_{45}) \cdot (-B) \quad \text{(Eq. 14a)}$$

and $$u_1 = v \cdot B \cdot [-a + (1-a) - a + (1-a)] = v \cdot B \cdot (2 - 4a) \quad \text{(Eq. 14b)}$$

respectively.

From FIG. 7, it can be noted that a/s = 1/(U/2n) or a = 1·s/(U/2n). Since the paths s and the magnetization width (U/2n) behave like the times t and $\Delta T/2$, Eq. 14b becomes:

$$u_1(t) = v \cdot B \cdot (2 - 8 \cdot 1 \cdot t / \Delta T) = 2v \cdot B \cdot 1 \cdot (1 - 4t/\Delta T) \quad \text{(Eq. 14c)}$$

At $t = \Delta T/2$, entrance 1, reversal point 3 and exit 5 of the conductor loop again coincide with magnetization limits and the process commences with reverse direction of field and voltage, i.e.:

$$U_1(t) = -2v \cdot B \cdot 1 \cdot (1 - 4t/\Delta T) \quad \text{(Eq. 14d)}$$

Figure 7B:
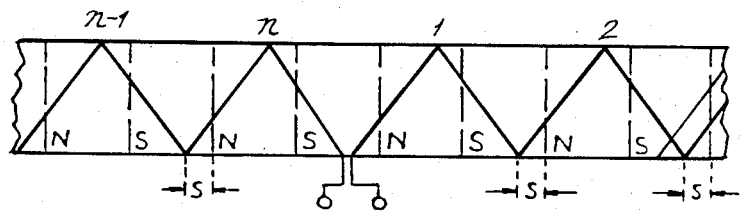
FIG. 7b shows an entire strand of the generator winding of FIG. 7a in the turned position "s"

Finally, n conductor loops can be arranged on the periphery U of the cylindrical winding $W_1$ which loops then all have the same relative rotary position s with respect to the magnetization limits (FIG. 7b). They can, therefore, be connected in series and increase $u_1(t)$ by the factor n. If one finally writes $2n \cdot v \cdot B = \hat{U}_1$, then Eqs. 14c and 14d pass into Eqs. 1a and 1b.

Figure 7C:
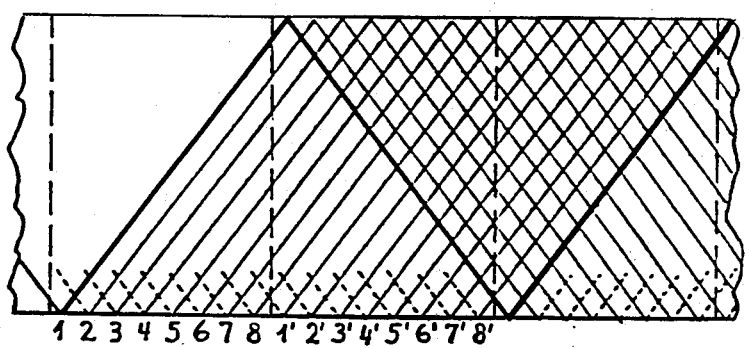
FIG. 7c is a diagram of the internesting of a plurality of generator windings.

As shown in FIG. 7c, further conductors extending in a triangular pattern, for instance 2, 3 ... 8, 1', 2', ... 8' can be internested with conductor 1. With, in general, i = 1 ... I, i' = 1 ... I windings which are internested in each other, however, only pairs i and i' supply opposite in-phase voltages $u_{1i}(t) = -u_{1i'}(t)$.

One advantage of the invention resides now specifically therein that for all 2·I strands, the circuit shown in FIG. 1 can be developed separately and in this way, the power to be transmitted by the capacitors $C_i$ and the diodes $D_i^+$ and $D_i^-$ is so limited that even with a large total power P, traditional components can be used. The impressed currents of the individual strands can then be summated on a pair of windings $W_2^+$, $W_2^-$ or on several groups of pairs of windings.

The division of the motor winding $W_2^+$, $W_2^-$ into several groups also affords advantages in accordance with the invention since in this way, the power to be transmitted by the commutating means can be so limited that, for instance, with a collector-less embodiment, traditional power semiconductors can be used. This division is also possible when manufacturing tolerances and material dispersion lead to small voltage differences between the winding strands $W_{2i} \pm$ since all are supplied by different winding strands of the generator G, i.e. from in each case their own current source.

Figure 10:
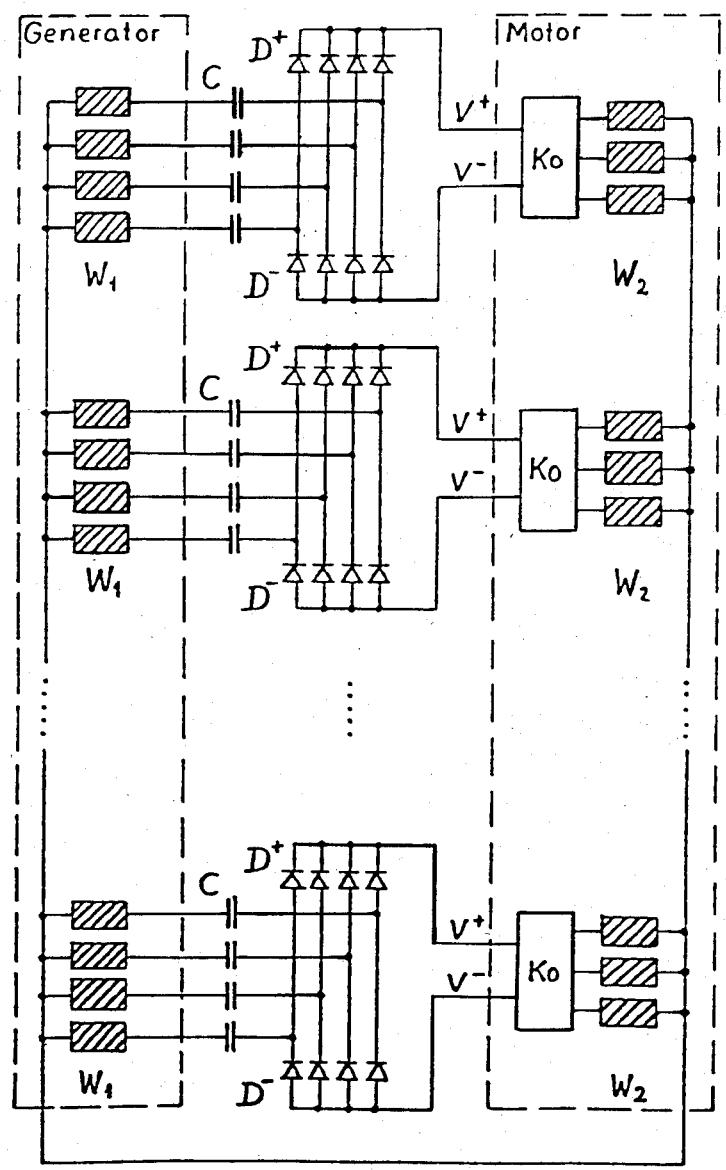
FIG. 10 is a showing of the strand groups of the generator winding $W_1$ and of the motor winding $W_2$.

In FIG. 8a, such a division into groups of strands is shown by way of example. First of all, the four strands 1, 5, 1' and 5' of FIG. 7c are so combined that their positive currents $i_1$, $i_5$, $i_1'$ and $i_5'$ behind the diodes $D^+$ are summated at $U_2^+$ while the corresponding negative currents $-i_1$, $-i_5$, $-i_1'$ and $-i_5'$ are summated at $-U_2$. The manner of operation of an individual strand is not affected by the fact that further strands are connected to the common voltage $+U_2$ or $-U_2$. The strands are so selected in accordance with the invention that with power matching the current pulses are superimposed, as shown in the Table of FIG. 8b, to form a continuous direct current. The remaining strands (FIG. 7c) are also combined into groups (2, 6, 2', 6'), (3, 7, 3', 7'), (4, 8, 4', 8') (FIG. 10).

Figure 6:
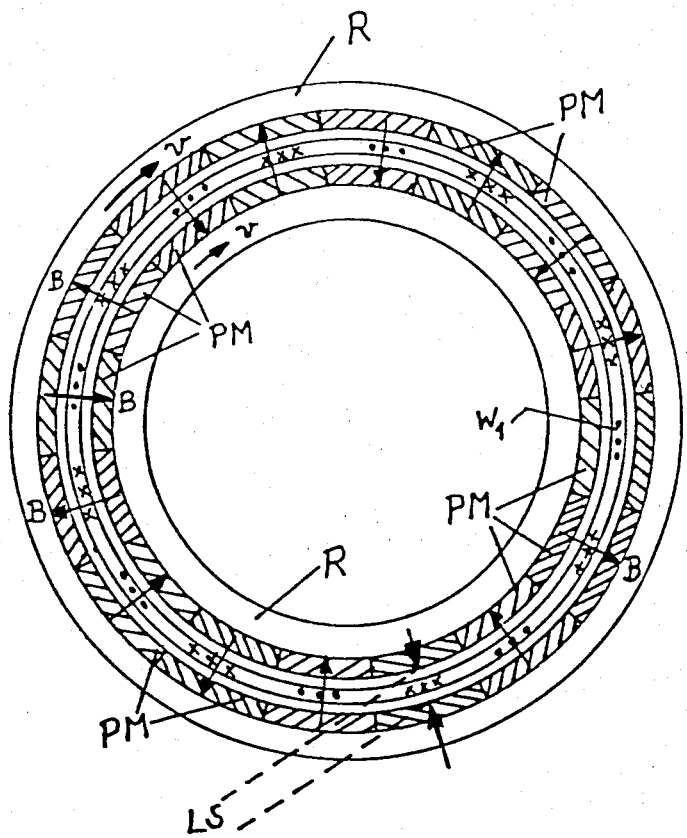
FIG. 6 is a diagrammatic cross-sectional view of the generator pole wheel.

The windings of the motor M are so located that the conductors extend in meander shape within the air gap of a pole wheel $P_2$ of the motor M which is of a construction similar to the pole wheel $P_1$ of the generator G (FIG. 6). In the ideal case, each conductor would then develop an alternately positive and negative square voltage as countervoltage. Since, however, a square course of the field in the pole wheel $P_1$ can be obtained only with difficulty, an approximately trapezoidal course (FIG. 8c) is obtained for the voltage $u_2(t)$ of a strand. If, for example, of the 12 strands of the motor M, the strands 1, 5 and 9 are selected, then at any moment at least one of the strands has the voltage $+U_2$ and another the voltage $-U_2$, i.e., for instance, at time $t_o$ (FIG. 8c), the strands 5 and 1. If now, in each case at the correct moment, the correct switch $S_i \pm$ in FIG. 8a is actuated and if, therefore, for instance, at the time $t_o$ the switches $S_1^-$ and $S_5^+$ are closed, the positive and negative generator currents can flow in each case through the corresponding winding strands of the motor M. The remaining strands of the motor are, of course, also combined into groups (FIG. 10).

The switches $S_i \pm$ can be either power semiconductors or mechanically acting commutators. However, since the winding cylinders $W_1$ and $W_2$ are advantageously arranged fixed in position and the pole wheels $P_1$ and $P_2$ can turn with respect to them at different speeds $N_1$ and $N_2$, electronic commutating without mechanically moved parts is certainly advantageous. An interchanging of the switch sequence of $S_i \pm$ permits a reversal in direction of rotation in simple manner.

Figure 9:
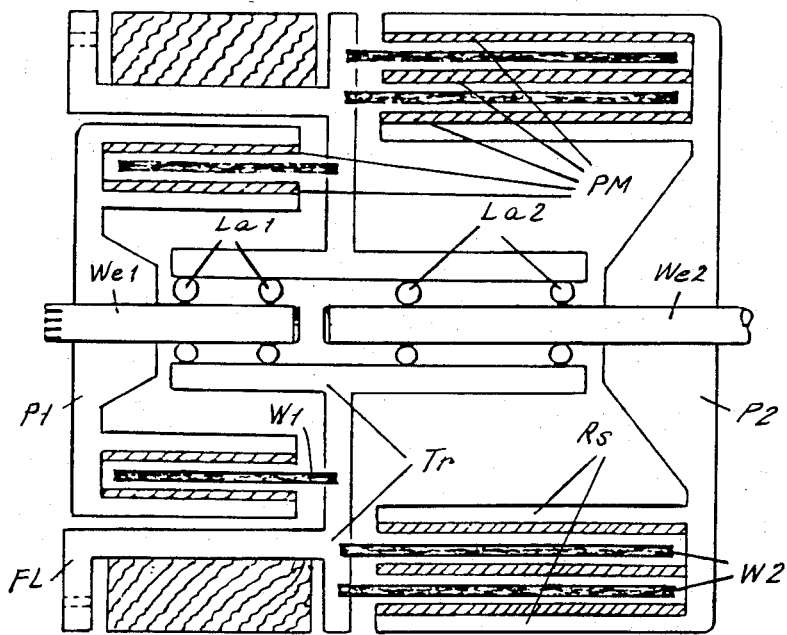
FIG. 9 is a diagrammatic longitudinal section through the electric torque converter.

Although the function in accordance with the invention of the electric torque converter is not dependent on the construction which has been shown by way of example, the construction shown in FIG. 9 results in case of realization of the functions in accordance with the invention.

A support structure Tr of rotational symmetry can be fastened by a flange F1 to the machine (not shown) which produces the input torque $M_1$. Tr furthermore contains the mounting La and La2 for the drive shaft We1 and the driven shaft We2. Finally, Tr bears the cylindrical winding $W_1$ of the generator part G and the winding $W_2$ of the motor part M.

The pole wheels $P_1$ and $P_2$ which bear the permanent magnets PM (FIG. 6) are fastened on the shafts We1 and We2. It is advantageous to arrange the larger magnetic surface of the pole wheel $P_2$, resulting from a higher driven mount $M_2$ in two concentric systems, in which case then, as a whole, less material is necessary for magnets and returns. Of course, in such case, the motor winding $W_2$ must also be arranged in two concentric cylinders. The capacitors $c_i$, the diodes $D_i^+$ and diodes $D_i^-$ as well as the commutating means (FIG. 8a) can be fastened in a readily accessible manner alongside the flange F1 to the support structure Tr.

The present invention can be embodied in other specific forms without departing from the spirit or essential attributes thereof and, accordingly, reference should be made to the appended claims, rather than to the foregoing specification as indicating the scope of the invention.

What is claimed is:

1. An electric torque converter, comprising:
   an alternating voltage generator having a group of triangularly wound output windings and means for magnetically exciting said windings, the orientation of the windings with respect to the poles of the generator producing approximately triangularly shaped voltage waveforms at an output of each winding;
   a dc motor having a group of windings and commutating means for coupling said group of windings of said dc motor to positive and negative terminals of said dc motor; and
   electrical rectifier and current limiting means interposed between said terminals of said dc motor and said windings of said generator for converting said triangularly shaped waveforms to a rectified output supplied to said terminals of said dc motor and for limiting the current drawn by said generator to below a predetermined value when the back EMF of said dc motor is at or near zero volts.

2. The electric torque converter as in claim 1 wherein said rectifier and current limiting means comprises:
   a plurality of capacitors, one respective capacitor being connected to each winding of said group of windings of said generator, each capacitor having a value which limits the current in its respective said winding to a value below said predetermined value; and
   a plurality of diode pairs, each diode pair electrically connecting a respective one of said capacitors to said dc motor, each diode pair having a positive node, a negative node and a common node, which are connected, respectively, to said positive and negative terminals of said dc motor and to said respective one of said capacitors, each one of said group of windings of said generator and said dc motor being Y-connected and having a respective neutral electrode, the neutral electrodes being connected to one another.

3. An electric torque converter, comprising:
   an alternating voltage generator having a plurality of winding groups and means for magnetically exciting said winding groups, each group including triangularly wound output windings, the orientation of the windings with respect to the poles of the generator producing approximately triangularly shaped voltage waveforms at an output of each winding;
   a dc motor having a plurality of winding groups equal in number to the number of said groups in said generator, a plurality of commutating means and pairs of positive and negative terminals, each commutating means coupling one of said winding groups of said dc motor to a respective pair of said pairs of terminals; and
   a plurality of electrical rectifier and current limiting means equal in number to the number of said winding groups in said generator, each electrical rectifier and current limiting means being interposed between said associated with one pair of said terminals and one winding group of said generator, each electrical rectifier and current limiting means adapted for converting said triangularly shaped waveforms from its associated generator winding group to a rectified output supplied to said associated pair of terminals of said dc motor and for limiting the current drawn by said associated generator winding group to below a predetermined value when the back EMF of said associated dc motor winding group is at or near zero volts.

4. The electric torque converter as in claim 10 or 3, wherein each winding group of said generator and said dc motor is Y-connected and comprises a neutral electrode, all the neutral electrodes being connected to one another.

5. An electric torque converter according to claim 4, wherein conductors of at least one group of said generator winding are arranged in delta form on the outer surface of a stationary cylinder which is immersible into an air gap of a pole wheel provided with a permanent magnet.

6. An electric torque converter according to any one of claims 1 or 3, wherein said alternating-voltage generator and said rectifier and current limiting means operate as a current generator to produce piecewise constant current waveforms.

7. An electric torque converter according to claim 6, wherein said winding group of said dc motor includes a pair of symmetrical windings defined by first and second armature windings, wherein said piecewise constant current waveforms includes alternatively a constant positive current followed by a constant negative current, said first and second armature windings being so connected to said winding group of said generator via said rectifier and current limiting means that said constant positive current flows through said first armature winding and said negative current flows through said second armature winding.

8. An electric torque converter according to claim 3, wherein said dc motor is divided into a plurality of partial systems, each partial system comprising one group of said winding groups and one respective commutating means for connecting said one group to its respective positive and negative terminals, each of said partial systems being mechanically connected in parallel and responsive to currents which are delivered from its respective rectifier and current limiting means independently of any currents in any other rectifier and current limiting means.

9. An electric torque converter according to any one of claims 1, 2, and 3 wherein respective pole wheels of said motor and generator are multi-shell wheels and are provided with a plurality of concentric air gaps.

* * * * *